United States Patent [19]

Nozue et al.

[11] Patent Number: 5,790,872
[45] Date of Patent: Aug. 4, 1998

[54] INTERRUPT CONTROL HANDLER FOR A RISC-TYPE MICROPROCESSOR

[75] Inventors: Yasunori Nozue; Toshiharu Ohshima, both of Kawasaki, Japan

[73] Assignee: Fujitsu Limited, Kawasaki, Japan

[21] Appl. No.: 933,251

[22] Filed: Sep. 18, 1997

Related U.S. Application Data

[63] Continuation of Ser. No. 451,967, May 26, 1995, abandoned.

[30] Foreign Application Priority Data

Sep. 29, 1994 [JP] Japan .................... 6-234968

[51] Int. Cl.⁶ .................................................. G06F 9/22
[52] U.S. Cl. ...................... 395/740; 395/734; 395/735; 395/736; 395/737; 395/800.41
[58] Field of Search ............................. 395/733, 734, 395/740–741, 735, 375, 737, 742, 868–870, 800.41

[56] References Cited

U.S. PATENT DOCUMENTS

| | | | |
|---|---|---|---|
| 4,881,228 | 11/1989 | Shouda | 395/183.15 |
| 5,179,704 | 1/1993 | Jibbe et al. | 395/733 |
| 5,363,506 | 11/1994 | Fukuoka | 395/733 |
| 5,432,943 | 7/1995 | Mitsuishi | 395/733 |
| 5,471,620 | 11/1995 | Shimizu et al. | 395/375 |
| 5,560,019 | 9/1996 | Narad | 395/733 |

FOREIGN PATENT DOCUMENTS 4-160650  6/1992  Japan .

*Primary Examiner*—Ayaz R. Sheikh
*Assistant Examiner*—Raymond N. Phan
*Attorney, Agent, or Firm*—Staas & Halsey

[57] ABSTRACT

The present invention relates to a data processing device that can perform independently a debug interruption process and a program interruption process. The data processing device consists of first and second interruption selection code producing units for producing interruption selection codes according to the first and second interruption requests respectively; and a switching unit for selectively switching to either one of interruption selection codes from said first and second interruption selection code producing units. When the second interruption request is received, the switching unit selects preferentially and output an interruption selection code from the second interruption selection code producing unit, thus jumping to an interruption process program according to the interruption selection code so that an interruption process according to said second interruption request is performed. The data processing device is applicable to RISC-type central processing units in computing systems.

17 Claims, 10 Drawing Sheets

INTERRUPT CONTROL HANDLER FOR A RISC-TYPE MICROPROCESSOR

This application is a continuation of application Ser. No. 08/451,967, filed May 26, 1995, now abandoned.

BACKGROUND OF THE INVENTION

1) Field of the Invention

The present invention relates to a data processing device such as a microprocessor used as a central processing unit in a computing system, and more particularly to a data processing device with improved interrupt control system which executes an interruption such as a program interruption and a debug interruption in a RISC-type microprocessor.

b 2) Description of the Related Art

Generally, microprocessors can be roughly classified in two categories: CISC (complex instruction set computer) and RISC (reduced instruction set computer).

CISC adopts tradeoffs in which hardware processes the functions of programming language as much as possible and belongs to computers having complicated, complex function instructions suitable for high-performance language. The CISC architecture is a conservative one which, in many cases, is adopted in architecture general-purpose computers such as main-frame computers and general-purpose microprocessors. The CISC architecture also adopts tradeoffs which avoids drastically changing a machine instruction set architecture, and avoids placing the major part of language processing under software compiler.

Contrary to CISC, RISC adopts tradeoffs in which software realizes the processing functions of programming language as much as possible, and uses the minimum number of instructions each having a basic simplified function. The simplified function facilitates hardware design and improves high speed operation of instruction. RISC architecture is characterized in that the functions allotted with hardware are minimized, but the functions allotted with software compiler are largely increased. The interface arranged between software and hardware which is a machine instruction set architecture, particularly, is used in VLSI-oriented computers in many cases.

The CISC-type data processing device has multifunctional instruction groups and many addressing modes. Interruption information is saved into a memory at an interruption occurrence time.

Where plural interruptions occur simultaneously, the priority order is decided based on every interruption factor. As shown in FIG. 7, interruption information sets are saved sequentially in a stack (LIFO, last-in first-out) form into the memory 100 in the order of lower acceptance priority. If information with lower acceptance priority must be masked with the previously accepted interruption, interruption information with high priority is stacked on it.

The interruption process is performed as shown in FIG. 8. In other words, a push-down operation is performed (or data is written into a stack) every time an interruption request with high priority is accepted. The interruption process is performed from an interruption factor (interruption $I_n$ in FIG. 8) at a stack top with the highest priority in the order of higher priority.

In this case, each interruption factor is processed by starting an interrupting handler (program) corresponding to each interruption factor. When each interruption process is ended, a pop-up process (reading data out of a stack) is performed. Then, a process to an interruption factor with high priority is performed.

On the other hand, in the RISC-type data processing device, a memory access is performed only by a load instruction and a store instruction. Saving to a memory at an interruption occurrence time is not automatically performed with hardware.

The interruption control system that performs an interruption process in the RISC-type data processing device, as shown in FIG. 9, consists of a priority unit 21, a complex interruption judging unit 22, an interruption factor register 23, a selector 24, an adder (ADD) 25, and a memory 26.

The priority unit 21 judges the interruption classification of a single interruption request accepted and whether the interruption can be masked and then outputs an interruption selection code corresponding to the interruption or an interruption process handler offset. The interruption flag accepted, as shown in FIG. 10, is set to the interruption factor register 23, based on the judgement result of an interruption classification by the priority unit 21.

The maskable interruption is an interruption that can be ignored or delayed if interruption occurs during an instruction execution. When being accepted, the maskable interruption is halted, immediately stopping the instruction during operation but is delayed and then is performed in the slit between instruction execution terms. The unmaskable interruption is an interruption that is not ignored even during instruction execution or that cannot advance forward if an interruption process is not performed immediately at the spot. The unmaskable interruption is an interruption process related to, for example, memory trouble (such as no existence of page).

The priority unit 21 operates when a sole interruption request is received. The complex interruption judging unit 22 judges whether an accepted interruption request is a sole interruption or a complex interruption (when plural interruption requests are received simultaneously). In the case of a sole interruption request, the selector 24 is switched to the priority unit 21. In the case of a complex interruption request, the selector 24 is switched to the complex interruption judging unit 22. The interruption selection code according to a complex interruption or complex interruption process handler offset is output. The priority unit 21 judges the classification of interruption at a complex interruption acceptance time. Plural interruption flags accepted are set to the interruption factor register 23.

As described above, the interruption factor register 23 is set as a flag a classification of interruption accepted. The selector 24 is switched according to a judgement result of the complex interruption judging unit 22. The selector 24 selects either the output of the priority unit 21 or the output of the complex interruption judging unit 22 to output as an interruption process handler offset to the adder 25 (to be described later).

The adder 25 adds an interruption process handler offset from the selector 24 to a predetermined interruption process handler base (address) and then calculates the address (entry) of a handler to execute an accepted interruption.

The memory 26 stores a handler which executes processes corresponding to various interruption processes. The memory 26 stores a complex interruption handler which processes according to the complex interruption at a complex interruption time, in addition to a process handler regarding interruptions $I_1$ to $I_n$ which processes corresponding to each interruption at a sole interruption request. The memory 26 is accessed with an address calculated by the adder 25 to output the corresponding address handler.

In the above configuration, when a sole interruption is accepted, the priority unit 21 judges whether or not the interruption can be masked. If the interruption is maskable, an interruption selection code is output according to the interruption after the instruction in execution is ended. If the interruption is unmaskable, an interruption selection code is output according to the interruption after the instruction in execution is interrupted. At the same time, the flag for the accepted interruption is set into the interruption factor register 23.

In this case, the selector 24 is switched to the side of the priority unit 21. The priority unit 21 provides its output as an interruption process handler offset to the adder 25. In order to perform an interruption process, the adder 25 calculates the address of a handler that processes according to the interruption and then jumps it to the interruption process handler.

Where a complex interruption is accepted, the complex interruption judging unit 22 provides an interruption selection code according to the complex interruption while it switches the selector 24 to the complex interruption judging unit 22. The adder 25 receives the output as an interruption process handler offset from the complex interruption judging unit 22 and calculates the address of a handler which processes according to the complex interruption. Then the output from the complex interruption judging unit 22 is jumped to the complex interruption process handler to perform a complex interruption process.

At the complex interruption acceptance time, the flag of each interruption is set to the interruption factor register 23 according to the classification judgement result from the priority unit 21.

FIG. 11 shows schematically the interruption process in the RISC-type data processing device. As shown in FIG. 11, the RISC-type data processing device performs the interruption process in the order of accepted interruption requests.

In the interruption process in the RISC-type data processing device, the interruption factor which does not need or desired to expose to the normal interruption process handler is viewed at a complex interruption occurrence time.

For example, since the current microprocessors each of which includes cache and memory management function cannot observe externally its memory accessing, the memory access can be checked by a debug interruption function such as a break point. As to the debug function, the current program count value is compared with a set break point address. When the current program count value corresponds to the set break point address, the debug interruption occurs.

It is desirable that the debug function does not influence the normal operation. The reason is that when the debug interruption as well as the general unmaskable program interruption occur simultaneously in the interruption process of the general RISC-type data processing device described above, the complex interruption judging unit 22 performs a complex interruption process handler so that an event to be debugged may not be reproduced.

In concrete, even if a new program count value (the address of an interruption process program (handler) to an accepted program interruption) set at the occurrence of a sole program interruption is erroneous, the event (the new program count value in error) may not be detected because another program count value (the address of an interruption composite process program) is set in the complex interruption process in which a debug interruption is simultaneously added.

SUMMARY OF THE INVENTION

The present invention is made to overcome the above mentioned problems. An object of the present invention is to provide a data processing device with an improved interruption control system that can independently perform debug interruption process and other normal interruption process, whereby an interruption process such as debugging can be easily and certainly performed.

In order to achieve the above objects, according to the present invention, the data processing device that jumps to an interruption program corresponding to each interruption request, in response to a first interruption request and a second interruption request, to perform an interruption process, is characterized by a first interruption selection code producing unit for producing an interruption selection code according to the first interruption request; a second interruption selection code producing unit for producing an interruption selection code according to the second interruption request; and a switching unit for selectively switching either an interruption selection code from the first interruption selection code producing unit or an interruption selection code from the second interruption selection code producing unit; whereby when the second interruption request is received, the switching unit selects preferentially and output an interruption selection code from the second interruption selection code producing unit, thus jumping to an interruption process program according to the interruption selection code so that an interruption process according to the second interruption request is performed.

According to the data processing device of the present invention, the second interruption process can be preferentially performed to the first interruption process. Since the first interruption process and the second interruption process are performed independently, the second interruption process can be performed easily and certainly.

Figure 1:
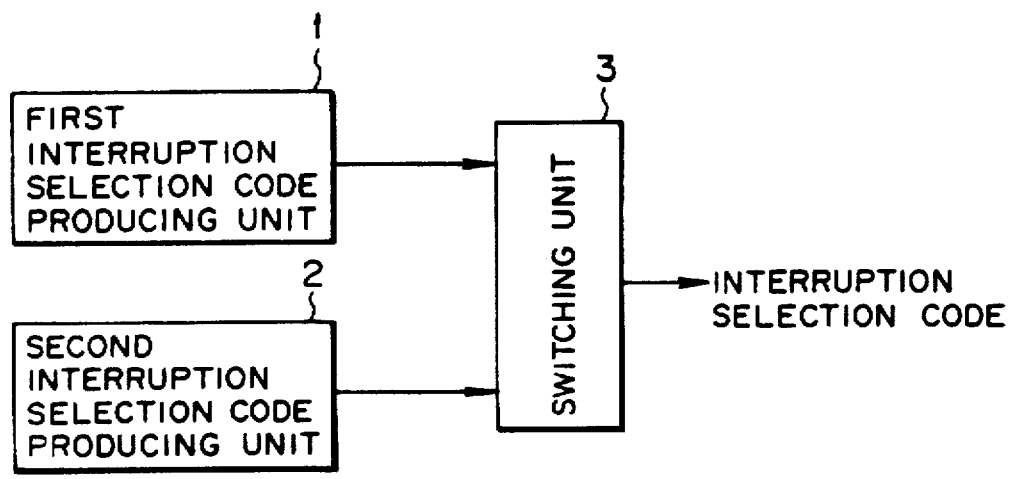
FIG. 1 is a block diagram showing an aspect of the present invention.

DESCRIPTION OF THE PREFERRED EMBODIMENTS (a) Aspect of Invention:

FIG. 1 is a block diagram showing an aspect of the present invention. Referring to FIG. 1, numeral 1 represents a first interruption selection code producing unit that produces an interruption selection code according to a first interruption request, 2 represents a second interruption selection code producing unit that produces an interruption selection code according to a second interruption request, and 3 represents a switching unit that selectively outputs either an interruption selection code from the first interruption selection code producing unit 1 or an interruption selection code from the second interruption selection code producing unit 2.

According to the present invention, when the second interruption request is accepted, the switching unit 3 preferentially selects and outputs an interruption selection code from the second interruption selection code producing unit 2.

Thus an interruption process (hereinafter, referred to as a second interruption process) is performed according to the second interruption request by jumping to an interruption process program according to the interruption selection code.

The data processing device includes a flag setting unit that sets and holds an interruption factor as a flag of the first interruption request accepted by the first interruption selection code producing unit 1, and an interruption selection code holding unit that holds an interruption selection code from the first interruption selection code producing unit 1 during performing an interruption process according to the second interruption request. Where the flag setting unit sets a flag when it restores from an interruption process according to the second interruption request, the switching unit 3 selects and outputs an interruption selection code in response to the first interruption request held in the interruption selection code holding unit. Thus, the process is jumped to the interruption process program according to the interruption selection code and then an interruption process (hereinafter, referred to as the first interruption process) may be performed according to the first interruption request.

Deterring means may be arranged that deters interruption saving information from being updated in the restoring operation from the second interruption process. Inhibiting means may be arranged that inhibits all interruption requests from being accepted during performing an interruption process according to the second interruption request.

Moreover, where the first interruption request for an unmaskable operation occurs during an operation of the second interruption process, transiting means that transits the process stop status may be arranged, or the second interruption may be a debug interruption.

In the data processing device according to the present invention shown in FIG. 1, when the second interruption request has been accepted, the switching unit 3 selects preferentially the interruption selection code from the second interruption selection code producing unit 2. The second interruption process is performed more preferentially than the first interruption process by jumping to the interruption process program according to the interruption selection code. Hence, the first interruption process and the second interruption process can be performed independently.

Where the flag setting unit sets a flag at the time restored from the second interruption process, the switching unit 3 selects an interruption selection code in response to the first interruption request held in the interruption selection code holding unit. The first interruption process is performed by jumping to the interruption process program according to the interruption selection code. Hence, where the first interruption request and a second interruption request are accepted together, or the second interruption request is accepted after the interruption of the first interruption process, the first interruption process can be resumed after the second interruption process.

When the second interruption process is restored, the deterring means deters the interruption saving information from being updated. Thus the interruption saving information can be maintained in the status saved before an execution of the second interruption process.

Moreover, the inhibiting means inhibits all the interruption requests from being accepted during an operation of the second interruption process. Thus the inhibiting means enables the device not to accept any new interruption till the completion of the second interruption process.

However, the transiting means transits the situation to a process stop status when the first interruption request for an unmaskable operation occurs during the second interruption process and then it can immediately perform a process to the first interruption request for an unmaskable operation.

The debug interruption process and other general interruption process can be performed independently by subjecting the second interruption to a debug process.

As described above, according to the data processing device of the present invention, the second interruption process can be perform preferentially to the first interruption process. The first interruption process and the second interruption process can be perfectly performed independently. The second interruption process can be easily and certainly performed.

Where the first interruption request and the second interruption request can be accepted at the same time, or the first interruption process is interrupted and then the second interruption request is accepted, the first interruption process can be resumed after the completion of the second interruption process. The first interruption process once received can be performed easily and certainly.

Since the interruption saving information can be maintained in the status saved before the second interruption process is performed, the first interruption process can be normally performed when the first interruption process is resumed after the completion of the second interruption process.

The system can be designed so as not to accept any new interruption request till the second interruption process is completed. It can be prevented that the process during or after the second interruption becomes complicated.

Where an event which wants for emergent countermeasures against an abnormal state such as memory trouble occurs during the execution of the second interruption process while the first interruption request for unmaskable operation occurs, the status can be transited to the process end status. As a result, some countermeasures can be immediately taken to the emergent event.

When the second interruption is a debug interruption, the debug interruption process can be performed independently from other normal interruption process. Hence, similar effect can be obtained as described above. Particularly, the configuration can perform easily and certainly the debug interruption process.

(b) Embodiment:

The embodiment according to the present invention will be described below with reference to the attached drawings.

Figure 2:
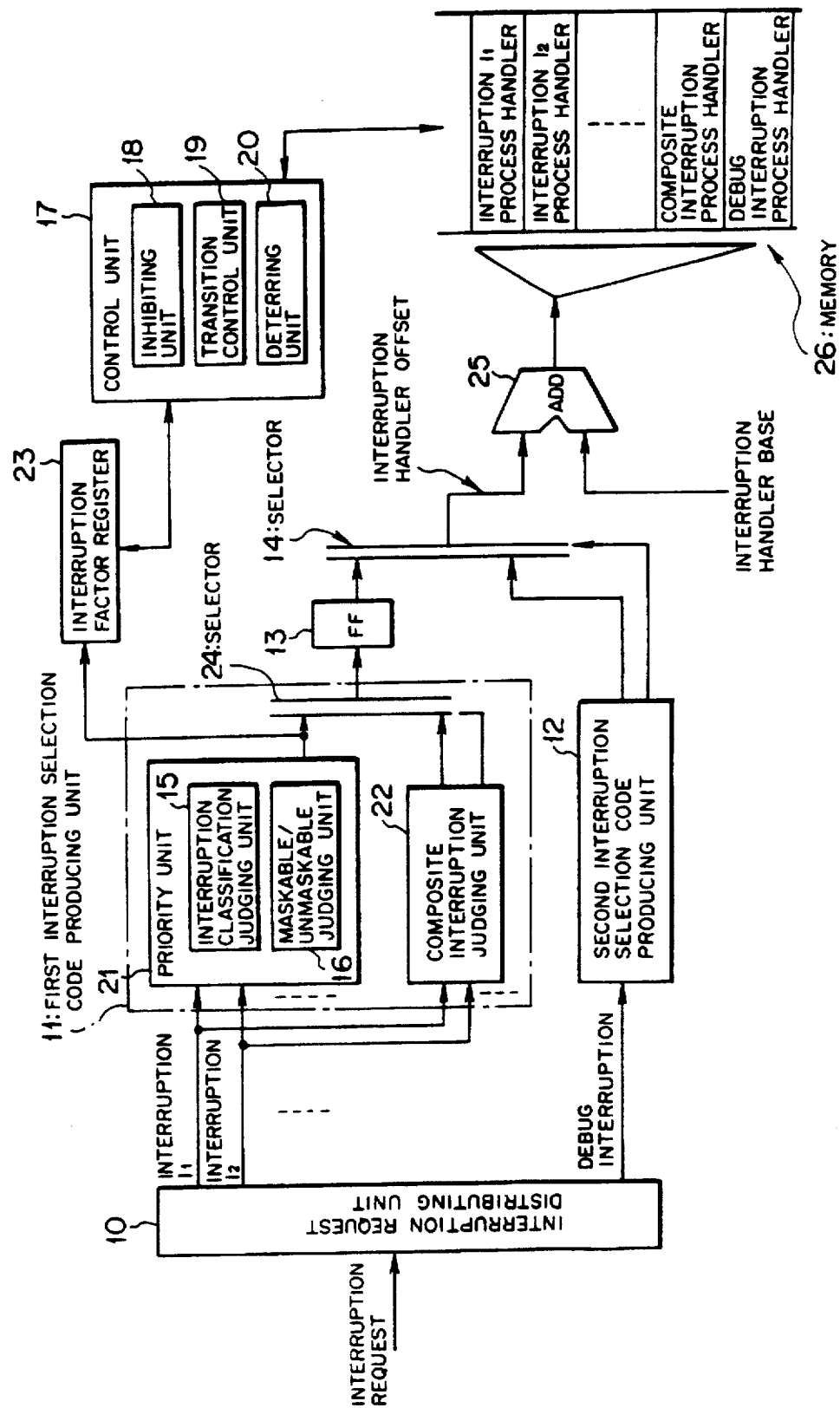
FIG. 2 is a block diagram showing an interruption request control system in a data processing device according to an embodiment of the present invention.

FIG. 2 is a block diagram showing the interruption request control system in the data processing device according to an embodiment of the present invention. According to the present embodiment, the case where the first interruption is a normal interruption such as program interruption and the second interruption is a debug interruption will be described below. In FIG. 2, like numerals described before represent like elements. Hence the duplicate explanation will be omitted here.

Referring to FIG. 2, numeral 10 represents an interruption request distributing unit, 11 represents a first interruption selection code producing unit, 12 represents a second interruption selection code producing unit, 13 represents a flip-flop (an interruption selection code holding unit), 14 represents a selector (a switching unit), 17 represents a control unit, 23 represents an interruption factor register (a flag setting unit), 25 represents an adder (ADD), and 26 represents a memory.

The interruption request distributing unit 10 distributes a normal interruption request and the debug interruption request. The interruption request distributing unit 10 outputs a normal interruption request to the first interruption selection code producing unit 11 and outputs a debug interruption request to the second interruption selection code producing unit 12.

When the first interruption selection code producing unit 11 distributes a normal interruption request from the interruption request distributing unit 10, it produces an interruption selection code (interruption process handler offset) according to a normal interruption request such as the program interruption request. The first interruption selection code producing unit 11 consists of a priority unit 21, a complex interruption judging unit 22, and a selector 24, like the general example shown in FIG. 9.

The priority unit 21 includes an interruption classification judging unit 15 that judges an interruption classification, and a maskable/unmaskable judging unit 16 that judges whether interruption is maskable or unmaskable. The interruption classification judging unit 15 judges the interruption classification corresponding to a sole interruption request accepted while the maskable/unmaskable judging unit 16 judges whether the interruption is maskable or unmaskable. And the priority unit 21 outputs an interruption selection code corresponding to the interruption or an interruption process handler offset. The interruption flag accepted is set to the interruption factor register 23, based on the decision result regarding interruption classification from the priority unit 21.

Figure 9:
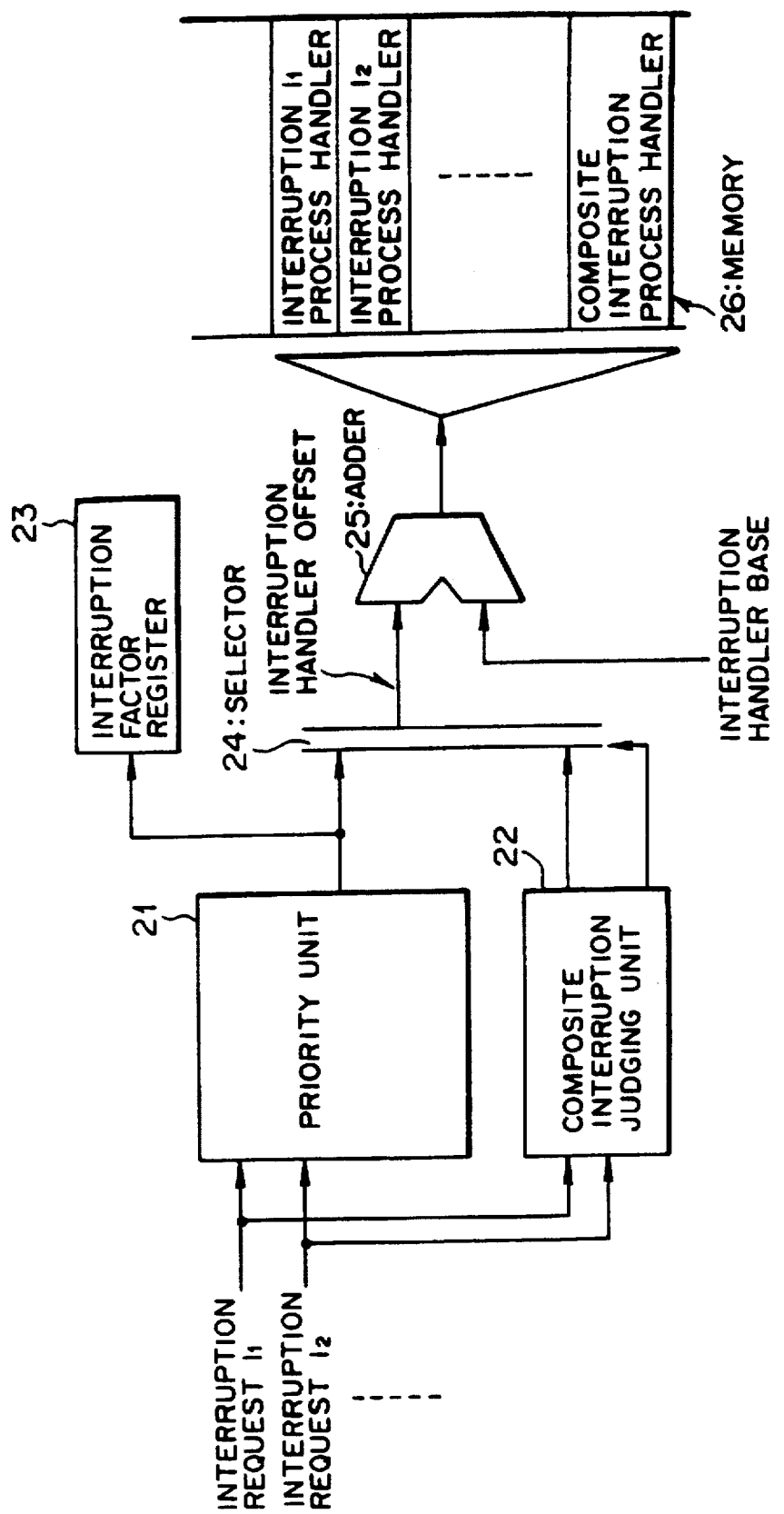
FIG. 9 is a block diagram showing the status of an interruption request control system in the RISC-type data processing device.
Figure 10:
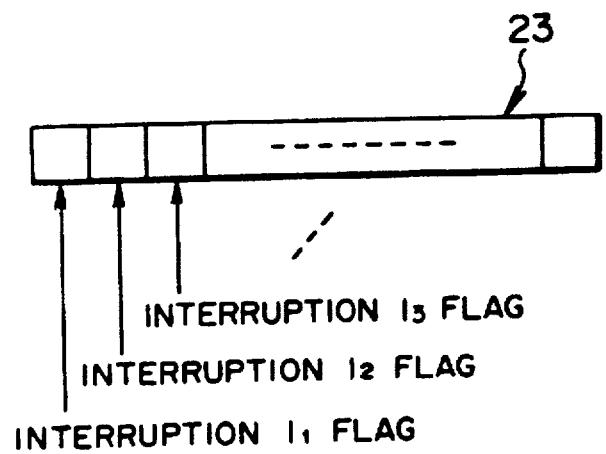
FIG. 10 is a diagram showing a general interruption factor register.
Figure 11:
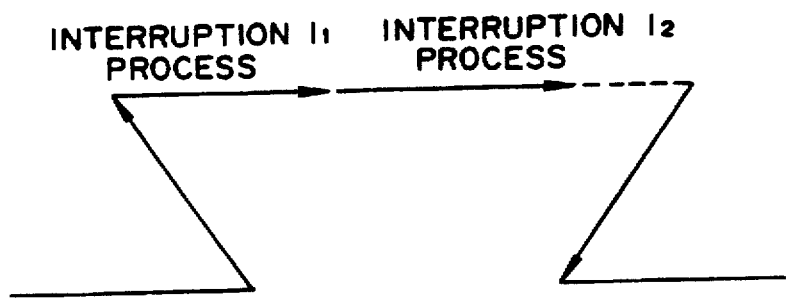
FIG. 11 is a diagram showing the interrupting operation in the RISC-type data processing device.

Like the general example shown in FIG. 9, the complex interruption judging unit 22 judges whether the interruption request accepted is a sole interruption or a complex interruption. If the interruption request is a sole interruption, the selector 24 is switched to the side of the priority unit 21. If the interruption request is a complex interruption, the selector 24 is switched to the side of the complex interruption judging unit 22 while it outputs an interruption selection code (complex interruption process handler offset) corresponding to the complex interruption.

The selector 24 is switched according to the judgement result from the complex interruption judging unit 22 to select either the output from the priority unit 21 or the output from the complex interruption judging unit 22, thus issuing the resultant output as an interruption selection code (interruption process handler offset) to the flip-flop 13 (to be described later).

The flip-flop (FF) 13 holds temporarily an interruption selection code corresponding to the normal interruption request, output from the first interruption selection code producing unit (selector 24) 11.

On the other hand, in response to a debug interruption request distributed from the interruption request distributing unit 10, the second interruption selection code producing unit 12 produces an interruption selection code (debug interruption handler offset).

The selector 14 selects either an interruption selection code (once held in the flip-flop 13) from the first interruption selection code producing unit 11 or an interruption selection code from the second interruption selection code producing unit 12 to output it as an interruption handler offset to the adder 25.

The selector 14 is switched to the side of the first interruption selection code producing unit 11 at a normal time. When the debug interruption request is distributed to the second interruption selection code producing unit 12, the selector 14 is switched to the side of the second interruption selection code 12 in response to the switching signal to select and output preferentially an interruption selection code from the second interruption selection code producing unit 12.

The interruption factor register 23 sets an interruption classification as a flag accepted by the first interruption selection code producing unit 11. The adder 25 adds an interruption process handler offset from the selector 14 to a predetermined interruption process handler base (address), and then calculates the address (entry) of a handler (program) which is to perform the accepted interruption process.

The memory 26 stores a handler (program) to execute a process corresponding to various interruptions. The memory 26 stores a process handler regarding interruptions $I_1$ to $I_n$ that perform processes corresponding to various interruptions in a sole interruption, a complex interruption handler that performs a process corresponding to a complex interruption, and a handler that performs a debug interruption process. In the same way as the conventional memory, the memory 26 is accessed with an address calculated by the adder 25 to output the handler of the corresponding address. During an interruption process execution, the memory 26 saves and holds various information such as PC (program counter) and PSW (program status word) immediately before the interruption process execution.

The control unit 17 manages comprehensively an interruption request control system in the data processing device according to the present embodiment. The control unit 17 has a function that saves various information such as PC and PSW immediately before performing an interruption process into the memory 26 at the start time of the interruption process (to be described rferring to FIG. 6 later), and a function that restores various information such as PC and PSW saved and held in the memory 26 at a time restored from an interruption process.

In the control unit 17 according to the present embodiment, where the interruption factor register 23 sets a flag at a time restored from the debug interruption process, the selector 14 selects and outputs an interruption selection code regarding a normal interruption request held in the flip-flop 13.

Moreover, according to the present embodiment, the control unit 17 includes an inhibiting unit (inhibiting means) 18, a transiting control unit (transiting means) 19, and a deterring unit (deterring means) 20, in addition to the above-mentioned function. The inhibiting unit 18 inhibits all interruption requests from being accepted during executing a debug interruption process. Where the maskable/unmaskable judging unit 16 judges that a unmaskable interruption request occurs during an execution of a debug interruption process, the transition control unit 19 transits the device according to the present embodiment in a process stop condition. The deterring unit 20 deters interruption saving information from being updating in a restoring operation from the debug interruption process.

Figure 6:
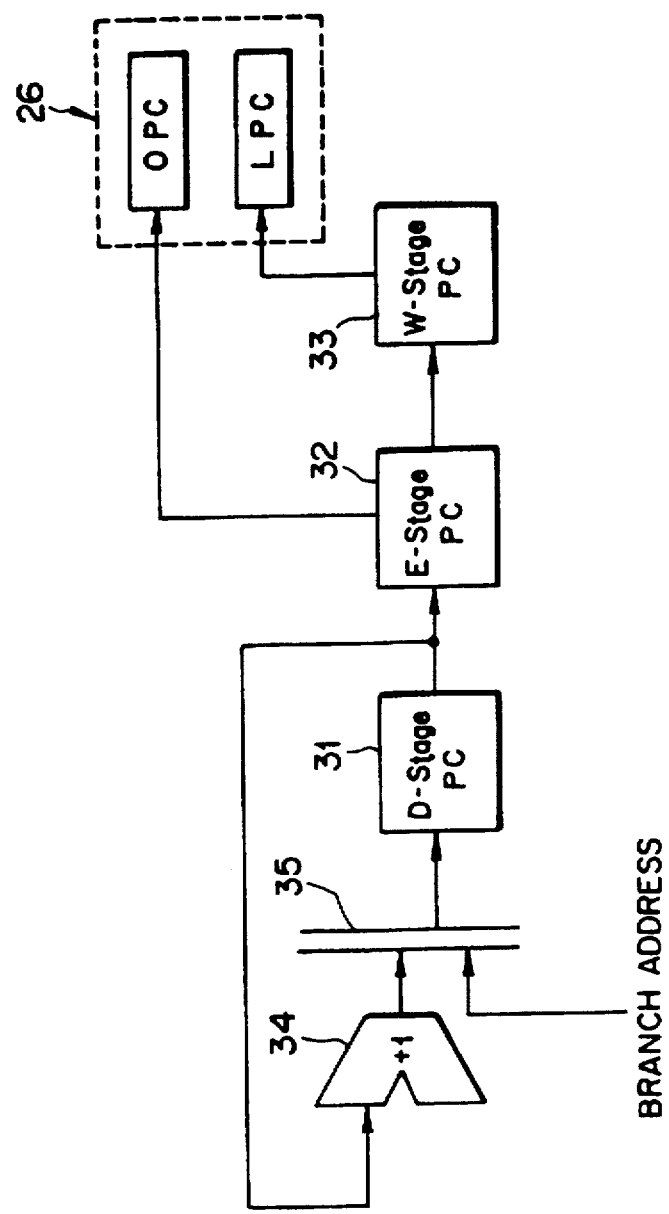
FIG. 6 is a block diagram used for explaining an example of saved information according to the present embodiment.
Figure 7:
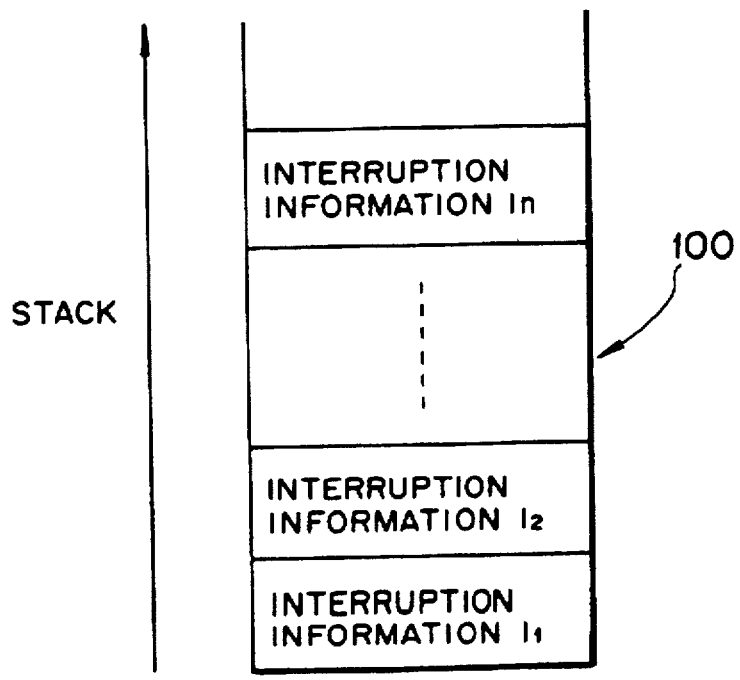
FIG. 7 is a diagram used for explaining the saving status of interruption information in the CISC-type data processing device.
Figure 8:
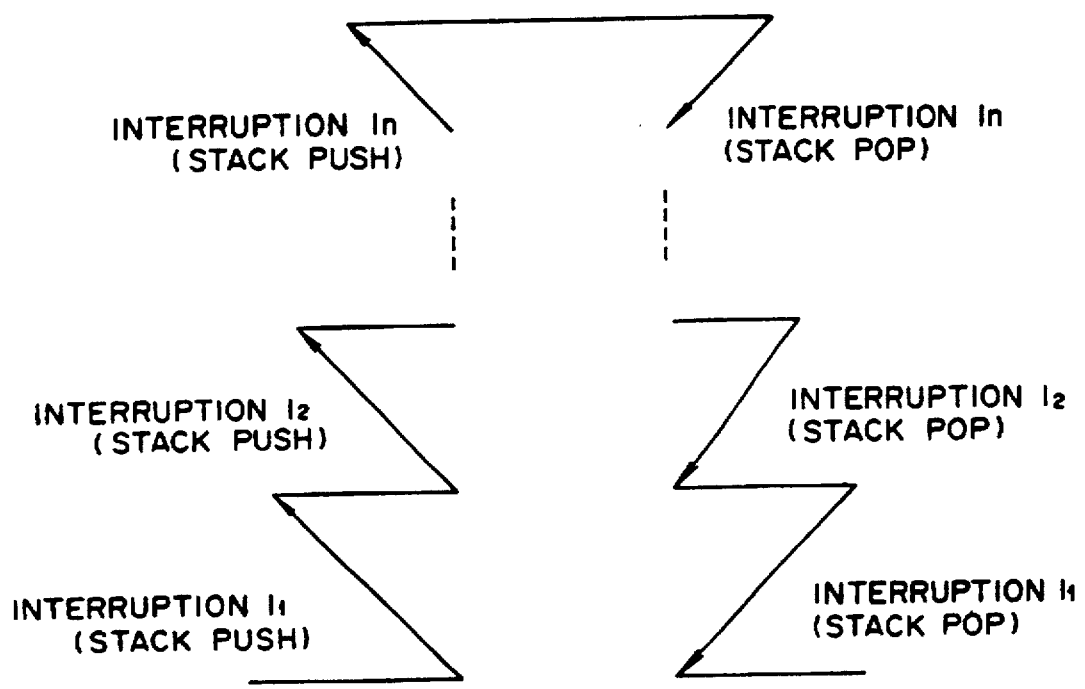
FIG. 8 is a diagram showing the interrupting process operation in the CISC-type data processing device.

An example of information saved into the memory 26 according to the information saving function of the control unit 17 will be briefly explained with reference to FIG. 6. In a kind of interruption, the address (LPC (last program counter)) of an instruction which has been executed immediately before an interruption process must be saved. FIG. 6 shows such an example or an example of the PC system of an instruction pipeline.

Referring to FIG. 6, numeral 31 represents a D-stage PC for counting a program count value in the D (decode) stage; 32 represents an E-stage PC for counting a program count value in the E (execution) stage; 33 represents a W-stage PC for counting a program count value in the W (write) stage; 34 represents an adder for adding one and counting up the count value in each of the D-stage PC 31 is counted; and 35 represents a selector that selects either a value from the adder 34 or a branch address externally added into write to the D-stage PC 31.

In the above configuration, the selector 35 selects an output from the adder 34 except when a branch instruction is provided. The adder 34 counts up the value in the D-stage PC 31 every time a process is performed one cycle. Then the resultant value is sequentially sent to the E-stage PC 32 and the W-stage PC 33 to execute a pipeline process. When a branch instruction is provided, the selector 35 selects the address to be branched to set to the D-stage PC31. Thereafter, as described above, the adder 34 counts up the each value of the PCs 31 to 33 every one cycle to perform a pipeline process.

As described above, when an interruption request occurs during a pipeline process, the value of the PC 32 regarding the instruction currently processed, or the instruction in the E-stage, is saved as an address OPC (old program counter) to be restored after an instruction process into the memory 26 while the value of the PC 33 regarding the instruction executed immediately before the interruption process, or the instruction in the W-stage, is saved as an address LPC (last program counter) executed immediately before an intermediate process into the memory 26.

Requesting again the above-type of interruption after restoration from the debug interruption process needs the address (LPC) of an instruction which has been executed before an occurrence of the debug interruption request.

Hence, according to the present embodiment, in order to request again an interruption after restoring from the debug interruption, the deterring unit 20 in the control unit 17 described above inhibits the LPC (interruption saving information) from being updated. Thus, the address of an restoration instruction debug interruption can be prevented from being written as the saving information LPC. A normal interruption process can be performed again using the address (LPC) of the instruction executed before the debug interruption request occurs.

Figure 3:
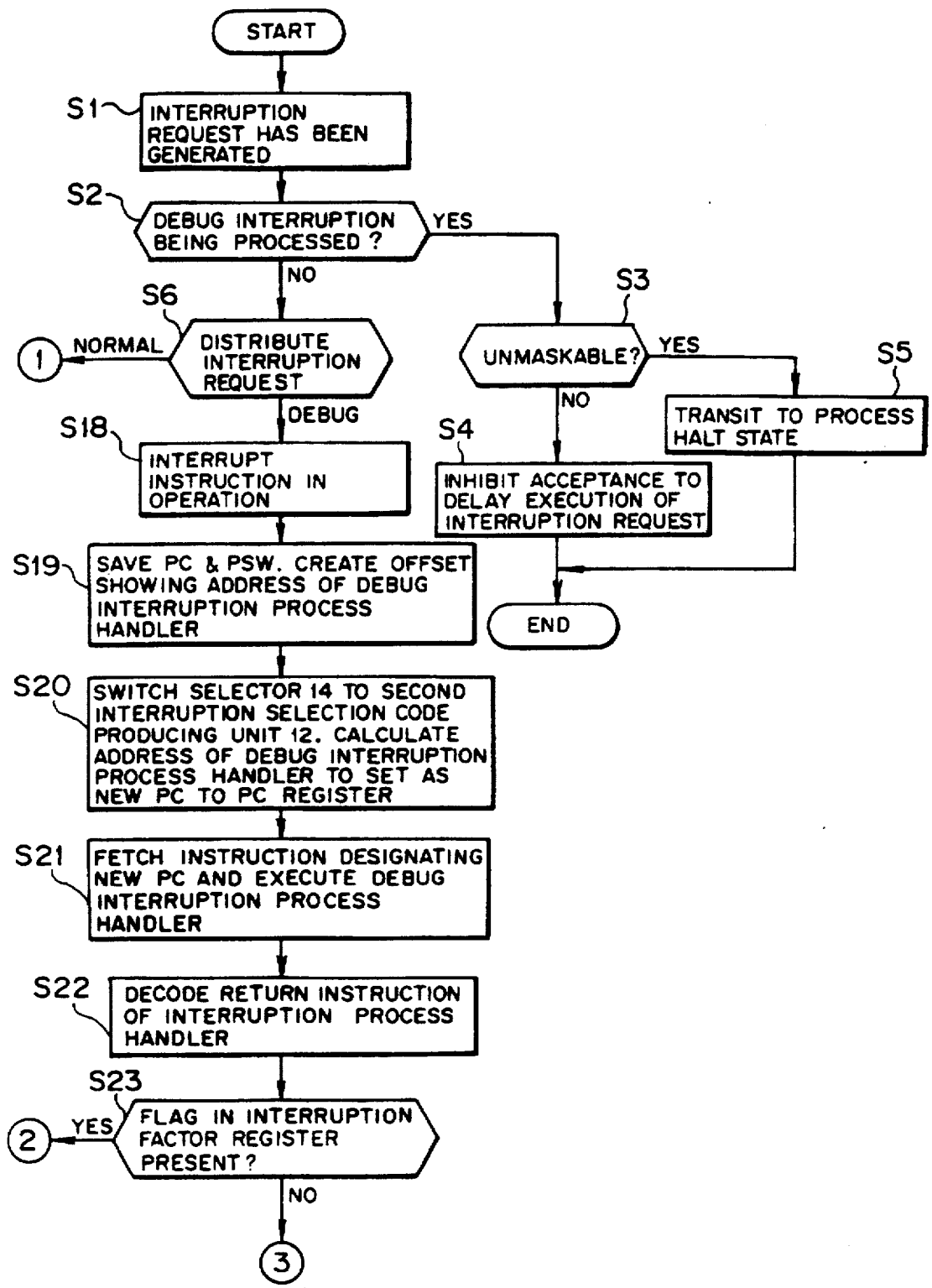
FIG. 3 is a flowchart used for explaining the operation of the present embodiment.
Figure 4:
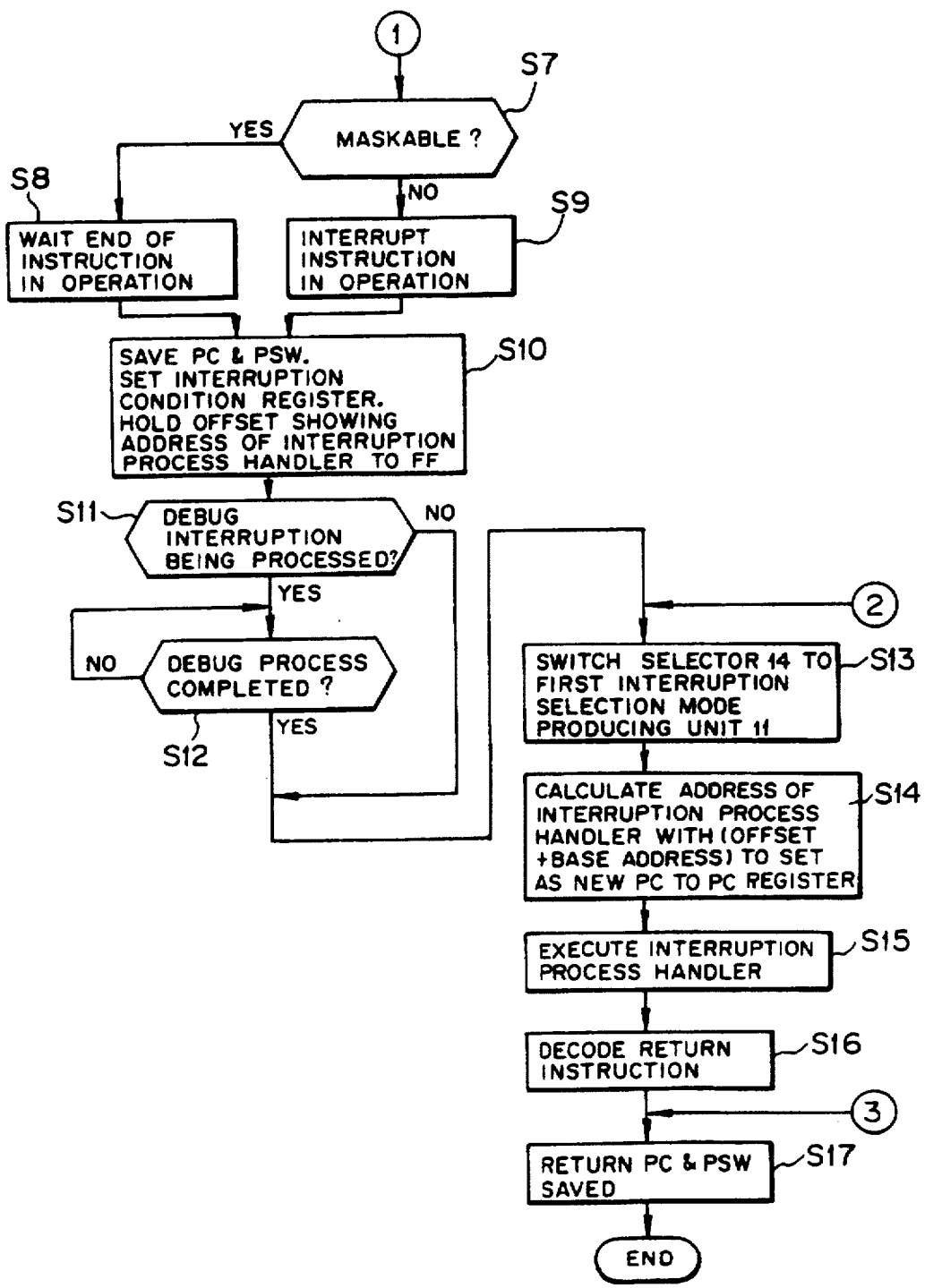
FIG. 4 is a flowchart used for explaining the operation of the present embodiment.

Next, the operation of the data processing device according to the present embodiment will be explained according to the flowcharts (steps S1 to S23) shown in FIGS. 3 and 4.

In the present embodiment, when an interruption request occurs in the data processing device (step S1), it is judged whether the debug interruption process is being executed at the present time (step S2).

When it is judged that a debug interruption is being processed in the step S2, it is judged whether the interruption request is unmaskable or not (step S3). If the interruption request is not unmaskable, the inhibiting unit 18 inhibits an acceptance of the interruption request to delay the execution of it (step S4). Accepting a new interruption request is entirely inhibited during the debug interruption process in the steps S2 to S4. As a result, it is prevented that the process during or after the debug interruption process is complicated.

Where it is judged that an interruption request is unmaskable in the step S3, the transition control unit 19 transits the device according to the present embodiment to the process inhibit condition (step S5). In the steps S2, S3, and S5, where an event such as a memory trouble that wants an emergent countermeasure occurs during the execution of a debug interruption process and an interruption request is unmaskable, the condition of the device can be transited to the process inhibit state. Hence, a certain treatment can be applied on an event that wants a quick treatment.

In the step S2, where it is judged that there is no debug interruption process, the interruption request distributing unit 10 judges whether the interruption request is a normal interruption request (first interruption request) or a debug interruption request (second interruption request) (step S6). Thus the normal interruption request is distributed to the first interruption selection code producing unit 11 while the debug interruption request is distributed to the second interruption selection code producing unit 12.

Where a normal interruption request is accepted, the priority unit 21 (the maskable/unmaskable judging unit 16) in the first interruption selection code producing unit 11 judges whether the interruption is maskable or unmaskable (step S7). If the interruption request is maskable, the end of the instruction currently processed is waited (step S8). Then the flow goes to the step S10. If the interruption request is unmaskable, the instruction currently processed is interrupted (step S9). Then the flow goes to the step S10.

In the step S10, the memory 26 saves PC and PSW, the request factor register 23 sets an interruption flag which is accepted according to the judgement result of the interruption classification judging unit 15. At the same time, the priority unit 21 judges an interruption vector number if a single interruption, or the complex interruption judging unit 22 judges an interruption vector number if complex interruption. The interruption selection code (a fixed offset value showing the address of an interruption process handler) corresponding to the interruption vector number is decided.

The selector 24 selects an interruption selection code from the priority unit 21 in the case of the single interruption, or selects an interruption selection code from the complex interruption judging unit 22 in the case of complex interruption to output it from the first interruption selection code producing unit 11. The flip-flop 13 stores temporarily the output (the interruption selection code in the first interruption request) from the first interruption selection code producing unit 11.

Next, it is judged whether a debug interruption is being processed or a debug interruption request has been accepted at the same time of accepting the first interruption request to be currently processed (step S11). Where a debug interruption is being processed or a debug interruption request is being accepted at the same time (YES judgement in the step S11), the debug interruption is preferentially processed (steps S18 to S22). The flow is waited until the debug process is completed or a YES judgement is obtained in the step S12.

Where NO judgement is obtained in the step S11 or YES judgement is obtained in the step S12, the selector 14 is switched to the side of the first interruption selection code producing unit 11 (the flip-flop 13) (step S13), outputs the interruption selection code (stored in the flip-flop 13) as an interruption process handler offset to the adder 25. The adder 25 calculates the address (=offset+base address) of a handler processing according to the interruption and sets the result as a new PC to the PC register (not shown) (step S14).

Thus, the adder 25 jumps to the interruption process handler (program) according to the new PC and then executes the handler so that an interruption process corresponding to the interruption request is performed (step S15). Thereafter, the restoration instruction is decoded (step S16) to restore the flow from the interruption process to the previous process. Then the PC and PWC saved into the memory 26 are restored (step S17) so that the interruption process corresponding to the interruption request is completed.

When the debug interruption request is accepted, the instruction currently processed (including a normal interruption process) is interrupted (step S18). While the PC and PWC are saved into the memory 26, the second interruption selection code producing unit 12 produces a fixed offset value indicating an interruption selection code or the address of a debug interruption process handler (step S19).

The selector 14 is preferentially switched to the side of the second interruption selection code producing unit 12 to outputs an interruption selection code therefrom as an interruption handler offset to the adder 25. The adder 25 calculates the address (=offset+base address) of a handler that performs process corresponding to a debug interruption to set the result as a new PC to the PC register (not shown) (step S20).

Thus, the instruction designated by a new PC is fetched so that the flow is jumped to the interruption process handler (program) corresponding to the new PC. The debug interruption process is performed by executing the handler (step S21). Thereafter, the flow goes back from the debug interruption process to the previous process by decoding the restoration instruction of the interruption process handler (step S22). In this case, according to the present embodiment, by referring to the interruption factor register 23, it is judged whether a flag indicating that another interruption request (the first interruption request) has been accepted in the interruption factor register 23 (step S23). If the flag is not in rest state, the flow goes to the step S17 to restore the PC and PSW saved in the memory 26. Thus the interruption process is completed.

In the step S23, if it is judged a flag is set in the interruption factor register 23, the interruption is requested again to change the flow to the step S13. Then the selector 14 is switched to the side of the first interruption selection code producing unit (flip-flop 13) 11, the steps S14 to S17 are processed in the previous way, using the interruption selection code stored in the flip-flop 13 so that the interruption is executed again.

Figure 5:
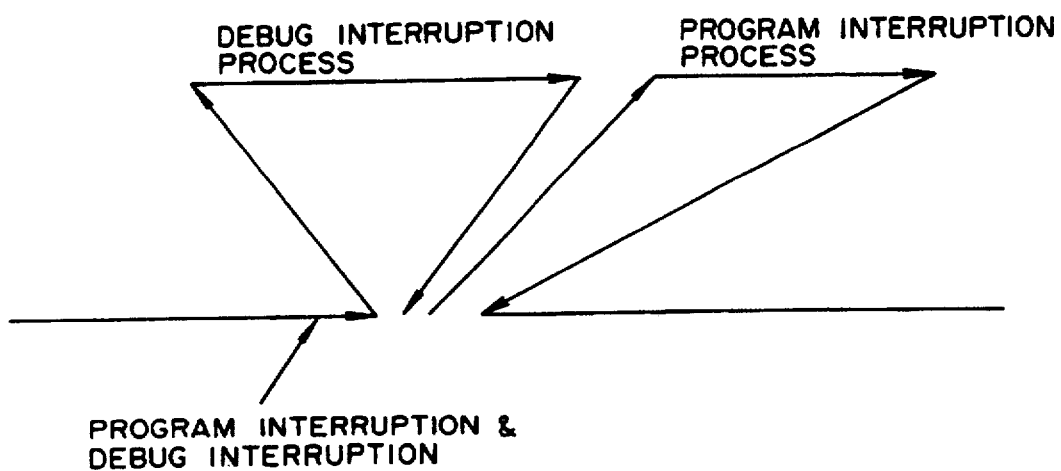
FIG. 5 is a diagram used for explaining the operation of the present embodiment.

FIG. 5 shows schematically the interruption process according to the device of the present embodiment where the program interruption (first interruption) and the debug interruption (second interruption) occur simultaneously. As shown in FIG. 5, in the device according to the present embodiment, when the program interruption and the debug interruption occur simultaneously, the debug interruption is preferentially processed and then the program interruption is processed. In this case, the various information (PC, PSW, etc.) saved at the program interruption event are obtained after restored from the debug interruption operation. The saving information occurs when the program interruption and the debug interruption have occurred. Hence there is no change in information regarding the program interruption at the debug interruption occurrence.

As described above, according to the embodiment of the present invention, the debug interruption process and another normal interruption process can be independently performed by improving an interruption control system. Particularly, since the debug interruption process can be preferentially performed to other interruption processes, it can be easily and certainly performed.

Where a debug interruption request and other interruption request are accepted simultaneously, or a debug interruption request is accepted after an interruption of a normal interruption process, the normal interruption process can be resumed after the debug interruption process. The interruption process once accepted can be easily and certainly performed.

In the above-mentioned embodiment, the case where the second interruption is a debug interruption has been explained. However, the present invention should not be limited to the embodiments. The present invention can be applied to the case where the second interruption must be preferentially processed to other interruption processes. Needless to say, even in such a case, the same function and effect as those in the above-mentioned embodiments can be obtained.

What is claimed is:

1. A data processing device that performs interruption processes in response to a first interruption request and a second interruption request, the data processing device comprising:

a first interruption selection code producing unit for producing an interruption selection code according to the first interruption request;

a second interruption selection code producing unit for producing an interruption selection code according to the second interruption request;

a switching unit for selectively switching between the interruption selection code from said first interruption selection code producing unit and the interruption selection code from said second interruption selection code producing unit;

a flag setting unit for setting and holding as a flag an interruption factor of said first interruption request received by said first interruption selection code producing unit;

an interruption selection code holding unit for holding an interruption selection code from said first interruption selection code producing unit during an interruption process according to said second interruption request; and wherein when a second interruption request is received, said switching unit preferentially selects and outputs an interruption selection code from said second interruption selection code producing unit, causing an interruption process according to the second interruption request to be performed, and when a flag is set in said flag setting unit upon restoring from an interruption process according to said second interruption request, said switching unit selects and outputs an interruption selection code in response to said first interruption request held in said interruption selection code holding unit causing the interruption process according to the first interruption request to be performed.

2. The data processing device according to claim 1, further comprising;

deterring means for deterring interruption saving information from being updated when said data processing device is restored from an interruption process according to said second interruption request.

3. The data processing device according to claim 1, further comprising:

inhibiting means for inhibiting all interruption requests from being accepted during performing an interruption process according to said second interruption request.

4. The data processing device according to claim 2, further comprising:

inhibiting means for inhibiting all interruption requests from being accepted during performing an interruption process according to said second interruption request.

5. The data processing device according to claim 1, further comprising:

transiting means for transiting in a process inhibit state when said first interruption request representing an unmaskable status occurs during performing an interruption process according to said second interruption request.

6. The data processing device according to claim 2, further comprising:

transiting means for transiting in a process inhibit state when said first interruption request representing an unmaskable status occurs during performing an interruption process according to said second interruption request.

7. The data processing device according to claim 3, further comprising:

transiting means for transiting in a process inhibit state when said first interruption request representing an unmaskable status occurs during performing an interruption process according to said second interruption request.

8. The data processing device according to claim 4, further comprising:

transiting means for transiting in a process inhibit state when said first interruption request representing an unmaskable status occurs during performing an interruption process according to said second interruption request.

9. The data processing device according to claim 1, wherein said second interruption is a debug interruption.

10. The data processing device according to claim 2, wherein said second interruption is a debug interruption.

11. The data processing device according to claim 3, wherein said second interruption is a debug interruption.

12. The data processing device according to claim 4, wherein said second interruption is a debug interruption.

13. The data processing device according to claim 5, wherein said second interruption is a debug interruption.

14. The data processing device according to claim 6, wherein said second interruption is a debug interruption.

15. The data processing device according to claim 7, wherein said second interruption is a debug interruption.

16. The data processing device according to claim 8, wherein said second interruption is a debug interruption.

17. A RISC data processing device that performs interruption processes in response to a first interruption request and a second interruption request, the data processing device comprising:

a first interruption selection code producing unit for producing an interruption selection code according to the first interruption request;

a second interruption selection code producing unit for producing an interruption selection code according to the second interruption request;

a switching unit for selectively switching between the interruption selection code from said first interruption selection code producing unit and the interruption selection code from said second interruption selection code producing unit;

a flag setting unit for setting and holding as a flag an interruption factor of said first interruption request received by said first interruption selection code producing unit;

an interruption selection code holding unit for holding an interruption selection code from said first interruption selection code producing unit during an interruption process according to said second interruption request; and wherein when a second interruption request is received, said switching unit preferentially selects and outputs an interruption selection code from said second interruption selection code producing unit, causing an interruption process according to the second interruption request to be performed, and when a flag is set in said flag setting unit upon restoring from an interruption process according to said second interruption request, said switching unit selects and outputs an interruption selection code in response to said first interruption request held in said interruption selection code holding unit causing the interruption process according to the first interruption request to be performed.

* * * * *